United States Patent

[11] 3,607,006

| [72] | Inventor | Edgel P. Stambaugh<br>Worthington, Ohio |
|---|---|---|
| [21] | Appl. No. | 848 |
| [22] | Filed | Jan. 5, 1970 |
| [45] | Patented | Sept. 21, 1971 |
| [73] | Assignee | Molybdenum Corporation of America<br>New York, N.Y. |

[54] PROCESS FOR RECOVERY OF COLUMBIUM
19 Claims, No Drawings

[52] U.S. Cl. ................................................. 23/18,
23/19, 23/140, 23/23, 23/24
[51] Int. Cl. ...................................................... C22b 59/00
[50] Field of Search ............................................ 23/15,
18–20, 22–24, 51, 140; 75/121

[56] References Cited
UNITED STATES PATENTS

| 2,819,945 | 1/1958 | Ruhoff et al. | 23/18 |
| 2,953,453 | 9/1960 | Foos | 23/18 UX |
| 3,003,867 | 10/1961 | Lerner | 23/18 X |
| 3,058,825 | 10/1962 | Cardon | 23/18 X |
| 3,107,976 | 10/1963 | Koerner et al. | 23/19 |

*Primary Examiner*—Herbert T. Carter
*Attorney*—Morgan, Finnegan, Durham & Pine

ABSTRACT: An improved process for the recovery of columbium values from concentrates, such as beneficiated ores, comprises the steps of (a) roasting a sulfuric-acid-baked leached concentrate, in which the columbium values have been fixed by treatment with alkali metal hydroxide or ammonia, with excess alkali metal hydroxide; and then (b) leaching the roasted concentrate to provide an aqueous concentrate of the water-soluble columbium values, and (c) recovering the columbium values from the concentrate by precipitation by cooling, pressure precipitation with carbon dioxide or precipitation by addition of alkali metal hydroxide or mineral acid. In a preferred embodiment, step (a) is carried out by roasting a sulfuric-acid-baked, leached concentrate with excess alkali metal hydroxide to simultaneously fix the columbium values.

PROCESS FOR RECOVERY OF COLUMBIUM

This invention relates to the recovery of columbium values from materials containing this substance. More particularly, it contemplates process for preparing columbium containing concentrates for subsequent extraction of the metal values. In addition, the invention relates to novel procedures to obtain columbium values, in high yield, substantially free of impurities.

BACKGROUND OF THE INVENTION

Columbium, also known as niobium, is a high-melting metal useful, for example, to strengthen metallic alloys, to make permanent magnets and in the welding of stainless steels. Columbium compounds are used as catalysts, and high purity columbium oxide is a component of high-grade optical glass.

Columbium occurs in many minerals, the most important of which are columbite and pyrochlore.

Columbite is a complex ferrous or manganous columbate-tantalate with a $Cb_2O_5$ to $Ta_2O_5$ ratio of usually about 8.5 or 10 to 1, and a columbium oxide content of 40-75 percent.

Pyrochlore is a complex oxide occurring in alkalic rocks containing calcium, cerium metals, fluorine and thoria. The columbium oxide content is about 47-70 percent and the $Cb_2O_5$ to $Ta_2O_5$ ratio is 20 to 1 and may be as high as 100 or 200 to 1 in the ore concentrate.

As a first step in extraction of the metal, in accordance with standard procedures, the columbium values in such minerals are concentrated by beneficiation processes, using specific gravity differences and particle surface chemistry. In the former "jigging" or "tabling," and in the latter "flotation" will be used to provide a concentrate, from which the columbium values then are extracted.

Five general extraction methods are employed for this purpose: fusion with alkaline fluxes; fusion with acid fluxes; digestion with acid solutions; digestion with alkaline solutions; and chlorination. For one reason or another, these methods have disadvantages.

For example, fusion with alkaline fluxes is expensive and it does not provide highly pure product; fusion with acid fluxes requires expensive platinum or silica vessels because iron crucibles are attacked; digestion with acid solutions, e.g., hydrofluoric acid, is expensive because of reagent cost and special materials are required to contain the corrosive acid; digestion with alkaline solution is practical only when used on a ferroalloy; and chlorination of a dry columbium concentrate to form a volatile columbium chloride requires expensive processing equipment, the time is long with low-grade columbium concentrates, and chlorine losses are high.

In any event, the known process which yields the highest grade product is digestion with hydrofluoric acid followed by a solvent extraction purification. As has been mentioned, this is an expensive process.

Recently, it has been proposed to recover columbium from various ores and concentrates by baking them with sulfuric acid, forming a flurry of the baked concentrate with water and then treating this with ammonia or an alkali metal hydroxide to "fix" the columbium values therein. Although the reason for the observation is not clearly understood at this time, this treatment appears to render the concentrate unexpectedly amenable to extraction of columbium values with cheaper acid, e.g., hydrochloric acid. The extracts will contain columbium values at concentrations manyfold higher than previously thought possible. Without such a fixation technique it is not possible to obtain columbium concentrations higher than 40 grams/liter in hydrochloric acid. With such a technique, 150 to 300 grams per liter of columbium values are easy to extract from the "fixed concentrate" into hydrochloric acid.

Advantages from such a process are self-evident. The size of commercial plants can be decreased several fold. It is not necessary to handle large volumes of solution to obtain a specified amount of columbium values.

The process, however, has two disadvantages. Before separation, the volume of the slurry of ammonia or alkali metal "fixed" sulfuric acid-baked concentrate and hydrochloric acid should be reduced to obtain best yields. Usually this is done by evaporation at elevated temperature until the volume is reduced by about one-half. At the usual acid concentrations, not all of the columbium values may be dissolved.

Therefore, it would be desirable to provide an alternate means to recover the columbium values from the ammonia or alkali metal "fixed" sulfuric acid baked concentrate, and such an improved process, a so-called "caustic roast-water leach" technique is the subject of this invention.

It is, accordingly, a primary object of this invention to provide high-purity columbium values, e.g., $Cb_2O_5$.

It is a further object of this invention to provide high-purity columbium values from various columbium ores and concentrates.

Still another object of this invention is to provide high-purity columbium values from a sulfuric-acid-baked columbium concentrate.

A further object of this invention is to provide high-purity columbium values from an ammonia-treated sulfuric-acid-baked concentrate.

Another object of this invention is to provide a process which overcomes all of the above-mentioned disadvantages of the prior art processes.

DESCRIPTION OF THE INVENTION

In accordance with the present invention, columbium values are recovered from their ores by a novel sequence of steps comprising:

a. mixing a columbium concentrate in which the columbium values have been fixed by treating a sulfuric-acid-baked concentrate with ammonia or an alkali metal hydroxide at a pH of greater than about 7.0 and at a temperature greater than about 25° C. with a concentrated alkali metal hydroxide and water to produce a paste;

b. roasting the mixture of step (a) until the formation of a water-soluble alkali metal-columbium complex salt is substantially complete;

c. aqueously leaching the product of step (b) to produce an aqueous of said alkali-metal-columbium complex salt and separating said solution from the residue; and d. recovering the columbium values from the solution of step (c).

It is a preferred feature of the invention to carry out the recovery step (d) by cooling the aqueous solution of step (c) to precipitate the columbium values. Preferably this will be done at a temperature above the freezing point of the mixture but below about 25° C., e.g., in the range of 0° C. to 10° C., and especially at about 8° C.

Another preferred feature of the invention is to treat the columbium values, precipitated by cooling, to remove occluded impurities, such as sodium and other acid solubles, e.g., barium, aluminum, iron, calcium, and the like. This is accomplished easily by leaching with a mineral acid, such as aqueous hydrochloric acid or nitric acid.

Still another feature of the invention is a process in which the leaching step (c) is carried out in at least two separate stages, the first to solubilize impurities, such as phosphorus, and to separate them, and the second and, optionally, subsequent stages to solubilize the columbium values. As will be seen, in the first stage, only enough water or aqueous alkali metal hydroxide solution is used to dissolve impurities but not enough to dissolve the columbium.

A further feature of the invention is to carry out the recovery step (d) by heating the aqueous solution of step (c) at superatmospheric pressure with carbon dioxide until all of the columbium values have been precipitated and recovering them. In essence, this embodiment involves heating an aqueous-caustic solution containing soluble columbium values in a closed system under a CO atmosphere at a temperature and pressure sufficient to promote conversion of the soluble columbium value to an insoluble form which may be recovered from the resulting slurry by filtration. Impurities, such as titanium, can be removed from pressure-precipitated $Cb_2O_5$ by leaching at atmospheric pressure under reducing conditions, such as those attained by adding aluminum metal to the hydrochloric acid leachant.

In proceeding according to the present invention, the material containing the columbium values preferably is ground to facilitate leaching and extraction, after which it is mixed with sulfuric acid and baked at elevated temperatures for the desired time. The objective of this step is to convert the columbium and some other metal values to a soluble form and leave the other impurities in an insoluble form. Optimum particle size will vary somewhat for different materials and is dependent upon the mineralogy of the particular material from which the columbium is to be separated. In most cases particles of 0.005–0.02 inch are useful. In general, however, with columbium concentrates comprising various oxides, e.g., $Cb_2O_5$, $SiO_2$, $TiO_2$, $Fe_2O_3$, CaO, BaO, PbO $ThO_2$, $U_3O_8$, $ZrO_2$, rare earth oxides and the like, there would be used sulfuric acid, preferably concentrated sulfuric acid, in an amount to provide from 1 to 5 parts (as 100 percent $H_2SO_4$) of acid per part of columbium oxide present in the concentrate. Baking temperatures are not particularly critical, e.g., 100°–400° C., can be used. Preferably baking at 300°–400° C. is used because the time required is only 1 to 2 hours, although the same results are obtained in 12 to 24 hours at the lower end of the range. In a preferred process, baking is carried out at about 300°–400° C. for 1 to 2 hours, then the product of this step is cooled and ground before leaching and fixing the columbium values.

In the next step, the baked concentrate is aqueously leached. The objective of this is to remove soluble impurities, e.g., sulfates. Preferably, leaching is carried out by agitating the ground, baked concentrate with enough water to dissolve the impurities and separating the water to leave a leached residue. It is generally satisfactory, for example, to leach in water at about 20 percent solids (based on original concentrate weight fed to the system) at about 25°–60° αC., for about 1 hour.

This step can remove rare earths, thorium, iron and other impurities.

In the next step, the columbium values are fixed, i.e., rendered amenable to efficient extraction, by treating with caustic, e.g., an alkali metal hydroxide, e.g., sodium hydroxide, potassium hydroxide or lithium hydroxide, and the like, or with ammonia, until the pH is greater than about 7.0 and at a temperature of greater than about 25° C.

In the following step, the fixed concentrate is mixed with sufficient alkali metal hydroxide to form the water-soluble complex alkali metal-columbium salt. The alkali metal hydroxide is added, preferably in a highly concentrated form, e.g., as an aqueous solution or suspension, such as 50 percent sodium hydroxide solution or as a solid, until a thick pasty mass is obtained. The consistency can be adjusted by adding water to facilitate handling. The ratio of $Cb_2O_5$ concentrate to NaOH to water in general will range, on a weight, weight, volume basis, from 125–250 to 25–450 to 0–1,000, respectively. Optimally 250 parts of fixed columbium concentrate will be mixed with 100–115 parts of sodium hydroxide and enough water will be added to form a thin paste. Mixing time will range from 15 minutes to 4 hours, but 30 minutes usually is sufficient.

As will be obvious to those skilled in the art, the fixing step and the mixing step can be simultaneous, and this is a preferred feature of the invention.

In the next step of the process the mixture of the caustic or ammonia-treated fixed concentrate and alkali metal hydroxide from the previous step is roasted. The object of this step is to convert the $Cb_2O_5$ into a water-soluble complex alkali metal-columbium salt which is easily extracted from the fixed concentrate. The efficiency of extraction depends on roasting conditions, i.e., concentrate/NaOH ratio, temperature and time. In general, as the temperature increases, e.g., from 110° C. to 700° C., extraction efficiency increases. As the roasting time increases, e.g., from 1 hour to 4 hours, efficiency increases. The best balance of process conditions in terms of efficiency is seen at 2.5 parts of concentrate per 1.0–1.15 parts of NaOH with a roasting temperature of 500°–700° C., preferably 600°–700° C., and a roasting time of 1 to 4 hours.

In the next step, the alkali metal hydroxide roasted product is aqueously leached. The objective is the use of several stages, with enough water in the first to dissolve impurities, but not enough to dissolve a substantial amount of the alkali metal-columbium complex. Then the complex is taken out in a second and, any optional, subsequent, leaches. Efficiency will depend on leaching conditions, time, temperature, volume of leachant, amount and nature of impurities, and the like. Usually, moderately elevated temperatures will be employed, e.g., 40°–100° C. Times of the order of 1 to 4 hours will be used. In the first leach, which is used mainly to remove any excess alkali metal hydroxide, phosphate and other impurities, a temperature lower than the subsequent leaches will be used, because these are to extract the alkali metal-columbium salt. In general, the first leach can be carried out with 3—4 volumes of water per part by weight of concentrate for 0.25 to 4 hours at 25°to 80° C. The second leach will be carried out with 12 volumes of water per part by weight of concentrate for 1 to 4 hours at 80°to 100° C., preferably about 96° C. Subsequent leaches will conveniently use the conditions of the second.

Using the sodium salt for purposes of illustration, since the solubility of the Na-columbium salt in aqueous caustic solutions is dependent on the pH of the solution (concentration of NaOH, the majority of the salt is extracted in the second and subsequent leaches, and only a small amount, less than 0.5 g./l., in the first. The first can thus be discarded without significant loss of columbium values.

Concentration of $Cb_2O_5$ in the second solution from the second leach is dependent on volume of leachant and can be adjusted. Usually, however, it will range from 13.6–22.6 g./l. under the condition described above.

Concentration of $Cb_2O_5$ in the solution from an optional third leach will range from less than 1 g./l. to about 5g./l. It may be economically feasible, therefore, to eliminate this step on a commercial scale.

In the next step, the columbium values are recovered from the leaching solutions. As mentioned above, either pressure precipitation or crystallization from solution (optionally, with acid or an alkali metal hydroxide) can be used. These will be exemplified in detail hereinafter.

In crystallization techniques, simply cooling the alkali metal-columbium containing solutions will cause precipitation of the columbium values. Cooling a solution containing 13.6 to 22.6 g./l. of the sodium-columbium salt to 25° C. will precipitate about 50percent, and to 0° C. will precipitate about 85 percent of the columbium value.

The best yields are obtained if the solutions are treated first with an excess of an alkali metal hydroxide, e.g., sodium hydroxide, and then cooled to about 8° C. The recovery of columbium values then is very high.

It is a preferred feature of this process to treat the precipitated columbium values with an acid, e.g., a mineral acid, such as hydrochloric acid or nitric acid. The objective is to remove occluded impurities. This step is carried out, for example, by leaching with 15 percent HCl or $HNO_3$, and sodium and other acid soluble impurities are dissolved. By this technique, it is easy to obtain $Cb_2O_5$ of greater than 99.5 percent purity.

In a preferred final step of the process, the precipitated columbium values, optionally leached with mineral acid, are calcined to obtain the final product. The object of this step is to heat the product to a high temperature but without fusing in order to obtain substantially pure columbium oxide. This step is carried out in a suitable apparatus, e.g., a calcining furnace at a temperature of from about 350° C. to about 1,000° C., preferably at about 600° C. until the product reaches a constant weight.

DESCRIPTION OF THE PREFERRED EMBODIMENTS

The invention is illustrated by the following examples.

EXAMPLE 1

An ore from Araxa, Brazil is concentrated by flotation and contains, in percent by weight: $Cb_2O_5$, 58.0; $SiO_2$, 1.0; $TiO_2$, 4.6; $Fe_2O_3$, 1.5; Bao, 14.0; and $ZrO_2$, 0.4. The concentrate is ground (100 percent passing 100-mesh sieve) and 100 grams is mixed with 100 grams of 96percent sulfuric acid and the mixture is baked at 350° C. for 1.5 hours.

The baked material is leached in water at 20 percent solids (based on original concentrate weight) at 27° C. for 1 hour and filtered to remove sulfate impurities. Some iron is also removed in this step. The mixture is filtered.

The wet filter cake is mixed with a 25 percent aqueous ammonia solution at 50 percent solids (based on concentrate weight) and agitated at 75° C. for 1 hour, then filtered to produce an ammoniated, leached concentrate in the form of a filter cake.

The filter cake is mixed with 100-115 grams of sodium hydroxide per 250 g. of cake, for 30 minutes, enough water being added to form a thin paste. The mixture is roasted at 550° C. for 4 hours.

The roasted cake is cooled and leached in three stages with water. In the first stage leach, for each 250 g. of original filter cake, 1 liter of water is added and the mixture is agitated at 75° C. for 4 hours. In the second stage leach, for each 250 g. of original filter cake, 3 liters of water is added and the mixture is agitated at 95° C. for 4 hours. In the third stage leach, the same conditions as in the second stage are used. The slurries from the leaches are filtered with vacuum to provide stock solutions containing columbium values. The second leach provides a concentrated aqueous solution with 13.6 to 22.6 g./l. $Cb_2O_5$ concentration, by analysis.

Four procedures are used to recover the columbium values:
1. The filtrate from the second leach is cooled to 0° C. and 85.3 percent of the columbium values precipitate and are recovered by filtration.
2. The filtrate from the second leach is cooled to 25° C. and about 50 percent of the columbium values are precipitated.
3. The filtrate from the second leach is cooled to 8°C. until precipitation of the columbium values is substantially complete, and these are recovered by filtration.
4. The filtrate from the second leach is treated with an excess of sodium hydroxide (until the pH is above 12.0) and cooled to 8° C. until precipitation of the columbium values is substantially complete, and these are recovered by filtration.

Columbium pentoxide of exceptionally high purity is obtained by leaching the product of steps (1), (2), (3), and (4) with 15 percent HCl or $HNO_3$ and filtering and drying. The use of HCl to leach product (2) gives $Cb_2O_5$ of 99.9 percent purity. $HNO_3$-leached product (1) is greater than 99.5 percent pure, as is the $Cb_2O_5$ of HCl-leached product (4).

EXAMPLE 2

A sulfuric-acid-baked concentrate is prepared according to the procedure of example 1.

The baked material is ground to a powder and stirred in water at 35 percent solids (based on the weight of the original concentrate). Thirty grams of solid sodium hydroxide is added to this slurried concentrate, which causes the temperature to rise to the boiling point. The mixture is stirred for 30 minutes and filtered.

The filter cake is mixed with sodium hydroxide, roasted and the roasted product is leached with water and the columbium values are recovered as described in example 1. Substantially the same results are obtained.

EXAMPLE 3

A sulfuric acid baked concentrate is prepared according to the procedure of example 1.

The baked material is leached with water, the wet filter cake is mixed with ammonia, agitated at 75° C. for 1 hour, then filtered, also according to example 1.

The ammonia processed concentrate is mixed under the conditions of example 1 with 1.15 parts by weight of sodium hydroxide per part of contained $Cb_2O_5$ (by analysis) and the pasty mixture is roasted at 550° C. for 1 hour.

After roasting, the product is ground and leached with water at 25°–35° C. for 15 minutes at 27 percent solids. The slurry is filtered and the solids are washed with an amount of water small enough not to dissolve columbium values. The amount of wash water is 60 percent of that used to leach the ground, roasted product.

The filtered solids contain about 45 percent water. A portion of the wet cake dried at 120° C. for 16 hours contains 34.5 percent $Cb_2O_5$.

The wet filtered solids containing columbium values are leached with water at 5–10 percent solids at 96° C. for 1 hour. The insoluble solids are recovered and the columbium values remain in the aqueous concentrate.

The $Cb_2O_5$ dissolved in the aqueous concentrate is 75.4 percent of that in the starting material.

The columbium values are recovered by adding excess sodium hydroxide to the aqueous solution, cooling to 8° C. until precipitation is complete, recovering the precipitate, leaching it with 15 percent hydrochloric acid and calcining the leached solids at 600° C.

EXAMPLE 4

The procedure of example 3 is repeated, using a 650° C. roasting temperature instead of 550° C. The $Cb_2O_5$ dissolved in the aqueous concentrate is 94.4 percent of that in the starting material, ammonia-fixed acid-baked leached concentrate.

EXAMPLE 5

The procedure of example 3 is repeated, substituting for the ammonia-fixed acid-baked concentrate, an unfixed acid-baked concentrate, leached with water, prepared as described in example 1, first and second paragraphs.

The $H_2SO_4$ roasted, water leached material is mixed with 2.73 parts by weight of sodium hydroxide per part of contained $Cb_2O_5$ and the pasty mixture is roasted at 650° C. for 1 hour.

After roasting the product is ground and leached as described in example 3 and an aqueous concentrate of columbium values is obtained.

The $Cb_2O_5$ dissolved in the aqueous concentrate is 86 percent of that in the starting material, $H_2SO_4$ roasted, water leached concentrate.

EXAMPLE 6

The procedure of example 5 is repeated, using instead of 2.73 parts by weight of sodium hydroxide, respectively, 1.15 and 2.00 parts per part by weight of contained $Cb_2O_5$ in the $H_2SO_4$ roasted, water-leached concentrate.

The $Cb_2O_5$ dissolved in the respective aqueous concentrates are, respectively, 91 and 90 percent of that in the starting material.

EXAMPLE 7

A sample of flotation concentration from beneficiating a pyrochlore ore from Araxa, Brazil, with an analysis described in example 1 is preprocessed with sulfuric acid and leached then roasted with sodium hydroxide according to this invention.

The concentrate (ground 100 percent to pass a 100-mesh sieve) is mixed with an equal part by weight of sulfuric acid (96percent) and baked at 350° C. for 1.5 hours.

The baked material is ground to a powder and stirred in water at 35 percent solids (based on the weight of original concentrate). After 15 minutes at 25°–35° C., the water is removed by filtration to leave an acid baked leached concentrate containing the columbium values.

To the concentrate is added 1.15 parts of sodium hydroxide per part of contained $Cb_2O_5$ and enough water to make a paste. The mixing requires about 30 minutes.

The paste is roasted at 650° C. for 1 hour.

The product is ground and leached with a first portion of water at ambient temperatures (25°–35° C.) for 15 minutes at 27 percent solids. The slurry is filtered and washed with an amount of water insufficient to dissolve columbium values (60 percent of the first portion of leach water).

The filter cake is releached with a second portion of water, three times the volume of the first portion, for 1 hour at 96° C. to solubilize the columbium values and provide, after filtration, an aqueous concentrate thereof.

Sodium hydroxide is added to the aqueous concentrate until the pH is greater than 12.0 and the mixture is cooled to 8° C. until precipitation of the columbium values is substantially complete.

The precipitated columbium values are leached with 15 percent hydrochloric acid to remove occluded impurities and excess sodium values.

The leached precipitate is calcined at 600° C. to obtain substantially pure $Cb_2O_5$.

Alternatively, addition of hydrochloric acid to the aqueous concentrate to a pH of 7.0 or less is used to precipitate the columbium pentoxide in a hydrated form.

EXAMPLE 8

An aqueous concentrate of columbium values prepared as described in example 3 is heated in an autoclave under carbon dioxide ($CO_2$) pressure. The $CO_2$ is added at room temperature. After the pressure has become stable at 200 p.s.i.g. at 25° C., the autoclave is heated to 175° C. for 15 minutes. The pressure at this temperature ranges from 325 to 430 p.s.i.g. During this time from 93–99.5 percent of the $Cb_2O_5$ is precipitated. The slurry is cooled to about 90° C., removed from the autoclave and filtered. The filter cake is leached at 60° to 80° C. for 30 to 60 minutes with either 15 percent HCl or 15 percent $HNO_3$ to remove acid-soluble impurities.

The $Cb_2O_5$ is recovered as a solid after filtration.

From the foregoing description and examples, it is obvious that a simple and efficient method of recovering and purifying the columbium values in a concentrate has been discovered.

Obvious modifications will suggest themselves to those skilled in the art. For example, the process has been described as applicable to columbium values in columbite and pyrochlore ores. However, the teachings herein will be applicable as well for other ores and concentrates therefrom such as tantalite, microlite, simpsonite, samarskite, fergusonite, tapiolite, euxenile, ilmeno-rutile, and the like. The teachings are also applicable in the separation and recovery of metal values closely associated by reason of common occurrence with columbium, such as tantalum, and the like.

I claim:

1. In an improved process for recovering columbium values from their ores the sequence of steps comprising:
   a. baking a columbium concentrate with sulfuric acid, fixing the columbium values by treating the sulfuric-acid-baked concentrate with ammonia or an alkali metal hydroxide at a pH of greater than about 7.0 and at a temperature greater than about 25° C. and then mixing said concentrate with a concentrated alkali metal hydroxide and water to produce a paste;
   b. roasting the mixture of step (a) until the formation action of a water-soluble alkali metal-columbium complex salt is substantially complete;
   c. leaching the product of step (b) with water to produce an aqueous solution of said alkali-metal-columbium complex salt and separating said solution from the residue; and
   d. recovering the columbium values from the solution of step (c).

2. A process as defined in claim 1 wherein step (d) comprises cooling the aqueous solution of step (c) until precipitation of the columbium values is substantially complete and separating said precipitated columbium values.

3. A process as defined in claim 2 including the step of leaching the precipitate with mineral acid to remove occluded impurities.

4. A process as defined in claim 1 wherein leaching step (c) is carried out in at least two separate states, the first to solubilize impurities and to separate them, and the second and subsequent stages to solubilize the columbium values.

5. A process as defined in claim 1 wherein step (d) comprises heating the aqueous solution of step (c) at super atmospheric pressure with carbon dioxide until all of the columbium values have been precipitated and separating said precipitate.

6. In an improved process for recovering columbium from its ores the sequence of steps comprising:
   a. baking a columbium ore concentrate with sulfuric acid;
   b. leaching said baked concentrate with water to produce a leached concentrate;
   c. fixing the columbium values in said leached concentrate by treating said concentrate with ammonia or an alkali metal hydroxide until the pH is greater than about 7.0 at a temperature of greater than about 25° C.;
   d. mixing the product of step (c) with an alkali metal hydroxide and water to produce a paste;
   e. roasting the mixture of step (d) until the formation of a water-soluble alkali metal-columbium complex salt is substantially complete;
   f. leaching the product of step (e) with enough water or aqueous caustic solution to dissolve impurities but not enough to dissolve a substantial amount of said complex and separating an aqueous solution of said impurities;
   g. leaching the product of step (f) with water to provide an aqueous solution of said complex;
   h. adding alkali metal hydroxide to the solution of step (g), cooling until precipitation of the columbium values is substantially complete and recovering said precipitate;
   i. treating the precipitate from step (h) with mineral acid to remove occluded impurities; and
   j. calcining the product of step (i) to obtain the final product.

7. A process as defined in claim 6 wherein in step (c) the columbium values are fixed with an alkali metal hydroxide.

8. A process as defined in claim 7 wherein the fixing step (c) and the mixing step (d) are simultaneous.

9. In an improved process for recovering columbium from its ores the sequence of steps comprising:
   a. baking a columbium ore concentrate with sulfuric acid;
   b. leaching said baked concentrate with water to produce a leached concentrate;
   c. fixing the columbium values in said leached concentrate by adding an excess of alkali metal hydroxide and roasting until the formation of a water-soluble alkali metal-columbium complex salt is substantially complete;
   d. leaching the product of step (c) with enough water to dissolve the impurities but not enough water to dissolve a substantial amount of said complex and separating an aqueous solution of said impurities;
   e. leaching the product of step (d) with water to provide an aqueous solution of said complex;
   f. adding alkali metal hydroxide to the solution of step (e), cooling until the precipitation of the columbium values is substantially complete and recovering said precipitate;
   g. treating the precipitate of step (f) with mineral acid to remove occluded impurities; and
   h. calcining the product of step (g) to obtain the final product.

10. A process as defined in claim 9 wherein step (a) is carried out with concentrated sulfuric acid at a temperature of from about 300° C. to about 400° C. for from about 1 to about 2 hours.

11. A process as defined in claim 9 wherein step (c) is carried out with sodium hydroxide and said roasting is at a temperature of from about 550° C. to about 700° C.

12. A process as defined in claim 9 wherein step (f) is carried out with sodium hydroxide and said cooling is at a temperature of from about 0° C. to about 10° C.

13. A process as defined in claim 9 wherein step (g) is carried out with hydrochloric acid.

14. A process as defined in claim 9 wherein step (h) is carried out at about 600° C.

15. A process as defined in claim 1 wherein step (d) comprises adding a mineral acid to precipitate the columbium values.

16. A process as defined in claim 15 wherein said mineral acid is hydrochloric acid.

17. In an improved process for recovering columbium values from their ores the sequence of steps comprising:
   a. baking a columbium concentrate with sulfuric acid at a temperature of from 100° C. to 400° C., fixing the columbium values by treating the sulfuric-acid-baked concentrate with ammonia or an alkali metal hydroxide at a pH of greater than about 7.0 and at a temperature greater than about 25° C. and then mixing said concentrate with a concentrated alkali metal hydroxide and water to produce a paste in which the ratio of columbium concentrate to alkali metal hydroxide to water ranges from 125–250 to 25–450 to 0–1,000 on a weight, weight, volume, basis;
   b. roasting the mixture of step (a) until the formation of a water-soluble alkali metal-columbium complex salt is substantially complete;
   c. leaching the product of step (b) with water to produce an aqueous solution of said alkali metal-columbium complex salt and separating said solution from the residue; and
   d. recovering the columbium values from the solution of step (c).

18. In an improved process for recovering columbium from its ores the sequence of steps comprising:
   a. baking a columbium ore concentrate with sulfuric acid at a temperature of from 100° C. to 400° C.;
   b. leaching said baked concentrate with water to produce a leached concentrate;
   c. fixing the columbium values in said leached concentrate by treating said concentrate with ammonia or an alkali metal hydroxide until the pH is greater than about 7.0 at a temperature of greater than about 25° C.;
   d. mixing the product of step (c) with an alkali metal hydroxide and water to produce a paste in which the ratio of columbium concentrate to alkali metal hydroxide to water ranges from 125–250 to 25–450 to 0–1,000 on a weight, weight, volume, basis;
   e. roasting the mixture of step (d) until the formation of a water-soluble alkali metal-columbium complex salt is substantially complete;
   f. leaching the product of step (e) with enough water or aqueous caustic solution to dissolve impurities but not enough to dissolve a substantial amount of said complex and separating an aqueous solution of said impurities;
   g. leaching the product of step (f) with water to provide an aqueous solution of said complex;
   h. adding alkali metal hydroxide to the solution of step (g), cooling until precipitation of the columbium values is substantially complete and recovering said precipitate;
   i. treating the precipitate from step (h) with mineral acid to remove occluded impurities; and
   j. calcining the product of step (i) to obtain the final product.

19. In an improved process for recovering columbium from its ores the sequence of steps comprising:
   a. baking a columbium ore concentrate with sulfuric produce at a temperature of from 100° C. to 400° C.;
   b. leaching said baked concentrate with water to produce a leached concentrate;
   c. fixing the columbium values in said leached concentrate by adding an excess of alkali metal hydroxide, the ratio of concentrate to alkali metal hydroxide ranging from 125–250 to 25–450 on a weight, weight, basis, and roasting until the formation of a water-soluble alkali metal-columbium complex salt is substantially complete;
   d. leaching the product of step (c) with enough water to dissolve the impurities but not enough water to dissolve a substantial amount of said complex and separating an aqueous solution of said impurities;
   e. leaching the product of step (d) with water to provide an aqueous solution of said complex;
   f. adding alkali metal hydroxide to the solution of step (e), cooling until the precipitation of the columbium values is substantially complete and recovering said precipitate;
   g. treating the precipitate of step (f) with mineral acid to remove occluded impurities; and
   h. calcining the product of step (g) to obtain the final product.